United States Patent [19]
Fairbanks et al.

[11] 3,853,548
[45] Dec. 10, 1974

[54] NI-AU BASE BRAZING ALLOY

[75] Inventors: Norman P. Fairbanks, Cincinnati, Ohio; Raymond P. Barb, Saugus; William Sutar, Boston, both of Mass.

[73] Assignee: General Electric Company, Cincinnati, Ohio

[22] Filed: Feb. 25, 1974

[21] Appl. No.: 445,120

[52] U.S. Cl. .................................................. 75/171
[51] Int. Cl. ............................................. C22c 19/00
[58] Field of Search ........ 75/171, 170; 148/32, 32.5

[56] References Cited
UNITED STATES PATENTS
| | | | |
|---|---|---|---|
| 2,755,183 | 7/1956 | Cape | 75/171 |
| 2,944,891 | 7/1960 | Cape | 75/171 |
| 3,764,307 | 10/1973 | Barb et al. | 75/170 |

*Primary Examiner*—R. Dean
*Attorney, Agent, or Firm*—Lee H. Sachs; Derek P. Lawrence

[57] ABSTRACT

An improved Ni-Au base brazing alloy is provided with a narrower temperature range between liquidus and solidus temperatures as a result of the combination of Cr and Fe along with Si and B to adjust the position of such range.

4 Claims, 2 Drawing Figures

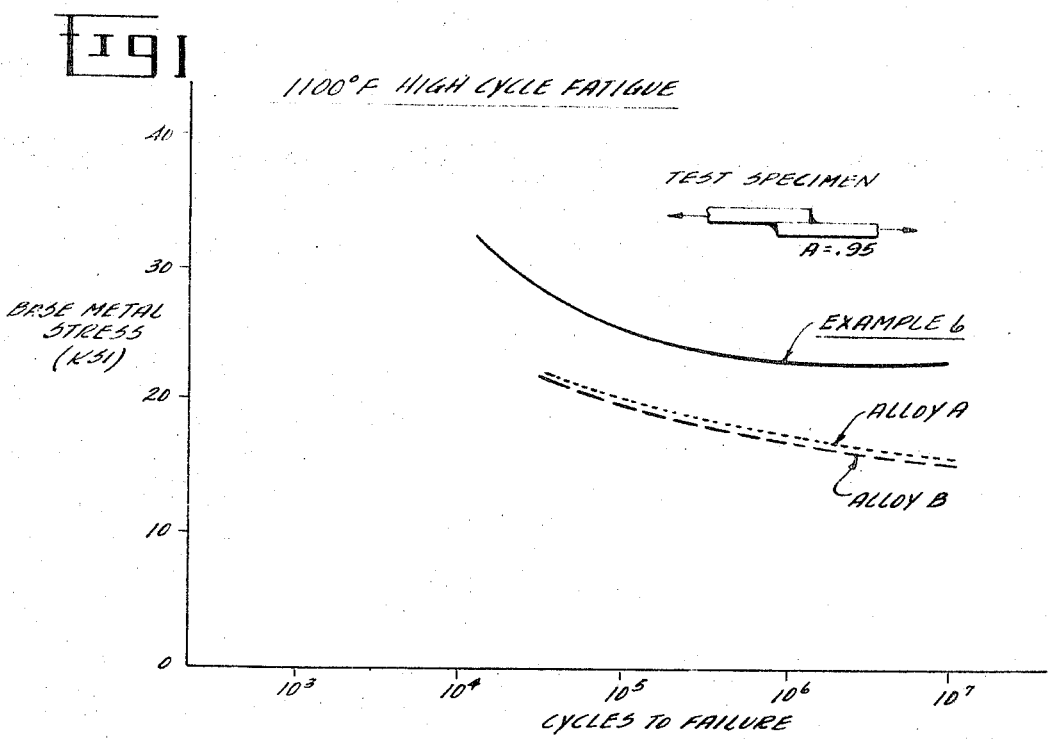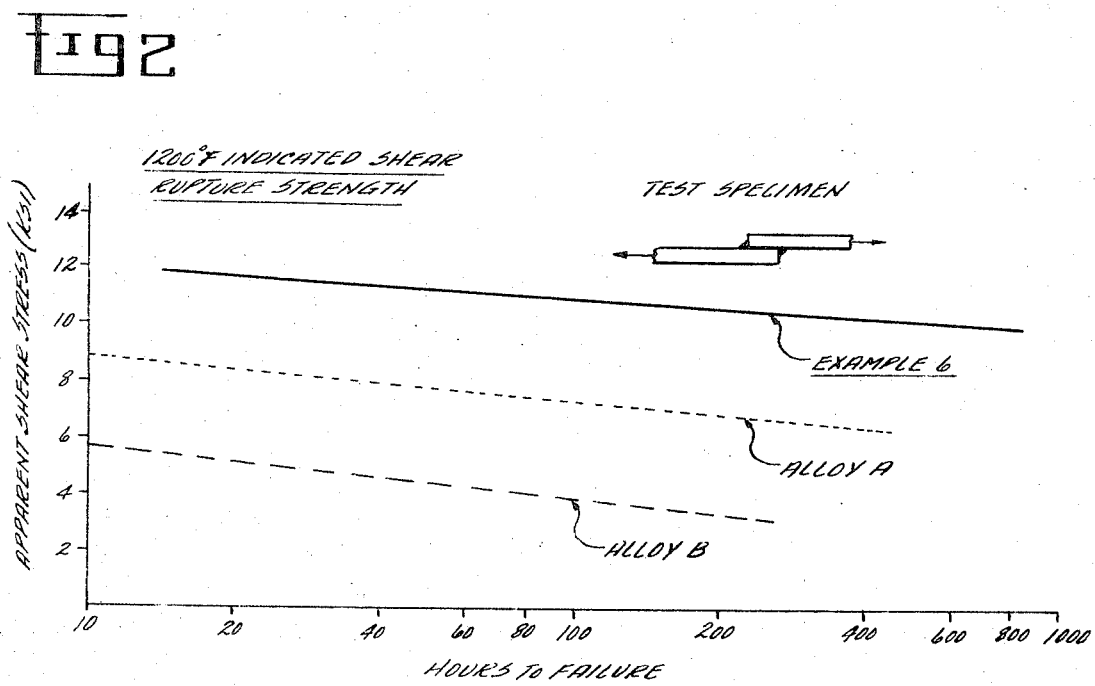

NI-AU BASE BRAZING ALLOY

BACKGROUND OF THE INVENTION

This invention relates to nickel-base brazing alloys and, more particularly, to an improved Ni-Au base brazing alloy for use in joining members intended to operate up to about 1400°F.

Known nickel-base brazing alloys including gold along with the temperature depressants Si and B have not provided the positive control of the range between liquidus and solidus temperatures to improve the brazing of members to be joined. In addition, certain of such known brazing alloys have included melting point depressants such as Mn which would sublime if used in a vacuum operation. Such an occurrence would result in compositional changes in the alloy which remains and contamination of the vacuum system. Use of such elements in joining components at higher temperatures results in relatively poor oxidation resistance.

SUMMARY OF THE INVENTION

It is a principal object of the present invention to provide an improved Ni-Au base brazing alloy having a composition range which can provide a relatively narrow temperature between liquidus and solidus and including elements which allow the relative positioning of such liquidus and solidus range depending upon the materials being joined.

Another object is to provide such an improved brazing alloy having a lower Au content that presently is used in Ni-base brazing alloys for vacuum brazing in the range of 1800°–2000°F.

These and other objects and advantages will be more clearly understood from the following detailed description, the drawing and specific examples, all of which are intended to be typical of rather than in any way limiting on the scope of the present invention.

Briefly, the present invention provides an improved Ni-Au base brazing alloy consisting essentially, by weight, 14–25% Au, 1–5% Si, 1–4% B, 2–12% Cr, 1–5% Fe, up to about 17% Pd with the balance essentially Ni and incidental impurities, with up to about 50 weight % of the Ni replaceable by Co.

BRIEF DESCRIPTION OF THE DRAWING

FIG. 1 is a graphical comparison of a preferred form of the brazing alloy of the present invention with other similar gold-bearing brazing alloys in respect to high cycle fatigue properties at 1100°F; and FIG. 2 is a graphical comparison of such alloys in respect to 1200°F rupture properties.

DESCRIPTION OF THE PREFERRED EMBODIMENTS

An evaluation of certain Ni-Au-Si-B brazing alloys in connection with the joining of components having an aerodynamic surface identified some undesirable characteristics. These included a somewhat sluggish capillary flow which appeared to result from a relatively wide temperature range between the liquidus and solidus temperatures of the brazing alloy. This resulted in an undesirable film or "scum" on the aerodynamic surface. Sluggish flow characteristics can be beneficial for wide-gap brazing methods and in joining non-critical parts. However, in the joining of aerodynamic surfaces across relatively close tolerances, a brazing alloy having a relatively narrow range between its liquidus and solidus temperatures is desirable.

The present invention recognizes that when both of the elements Cr and Fe are included in the Au-Ni base, control of the range between liquidus and solidus temperature can be attained. Thus the present invention provides an improved brazing alloy including all of the elements Fe, Cr, Au in a Ni-base along with Si and B for melting point control. If desirable, the Ni can be replaced with up to about 50 wt. % Co with only a slight decrease in melting temperature, for example about 25°F. For ductility purposes and as a replacement for the Au, up to about 17% Pd can be included.

During the evaluation of the present invention, a wide variety of brazing alloy compositions were evaluated. The following Table includes the composition of some of such brazing alloys.

TABLE

| | COMPOSITION (Wt. %) | | | | | |
|---|---|---|---|---|---|---|
| | Balance Ni and incidental impurities | | | | | |
| Example | Au | Si | B | Cr | Fe | Pd |
| 6 | 20.5 | 3.4 | 2.3 | 5.3 | 2.3 | |
| 7 | 15.0 | 2.2 | 1.5 | 3.5 | 1.3 | 17.0 |
| 8 | 17.4 | 3.9 | 2.3 | 5.5 | 2.4 | |
| 9 | 14.9 | 4.1 | 2.4 | 5.7 | 2.5 | |
| 10 | 12.5 | 4.2 | 2.5 | 5.9 | 2.6 | |
| 11 | 10.0 | 4.4 | 2.5 | 6.1 | 2.7 | |
| 12 | 17.5 | 3.8 | 2.2 | 5.3 | 2.3 | 2.0 |
| 13 | 12.7 | 4.1 | 2.4 | 5.7 | 2.5 | 1.5 |
| 14 | 8.5 | 4.4 | 2.5 | 6.1 | 2.6 | 1.0 |
| 15 | 18.5 | 2.1 | 1.0 | 6.2 | 2.1 | 4.1 |
| 16 | 18.5 | 2.0 | 1.0 | 8.3 | 2.1 | 4.1 |
| 17 | 18.7 | 2.5 | 1.7 | 6.3 | 2.1 | 4.2 |
| 18 | 18.0 | 2.5 | 1.0 | 8.4 | 2.1 | 4.0 |
| 19 | 15.0 | 2.5 | 1.0 | 8.4 | 2.1 | 6.0 |
| 20 | 20.5 | 2.5 | 1.4 | 5.3 | 2.3 | |
| 21 | 20.5 | 3.0 | 2.0 | 5.3 | 2.3 | |
| 22 | 20.5 | 2.0 | 1.5 | 5.3 | 2.3 | |
| 23 | 20.5 | 2.0 | 1.5 | 7.3 | 2.3 | |
| 24 | 20.5 | 2.0 | 1.5 | 9.3 | 2.3 | |
| 25 | 20.5 | 2.0 | 1.3 | 12.0 | 2.0 | |
| 26 | 20.5 | 2.0 | 1.3 | 4.0 | 2.0 | |
| 27 | 17.5 | 2.3 | 1.7 | 4.0 | 1.7 | 2.0 |
| 28 | 17.5 | 1.6 | 1.2 | 2.8 | 1.2 | 2.0 |
| 29 | 15.0 | 2.3 | 1.7 | 3.9 | 1.7 | 4.5 |
| 30 | 15.0 | 1.6 | 1.2 | 2.8 | 1.2 | 4.5 |
| 31 | 10.0 | 2.3 | 1.7 | 3.9 | 1.7 | 9.5 |
| 32 | 10.0 | 1.6 | 1.2 | 2.8 | 1.2 | 9.5 |

Each of the compositions were arc melted in an argon atmosphere and then crushed into pieces. These pieces were first tested in vacuum on flow panels to determine melting range. Those compositions exhibiting desirable characteristics, such as liquidus and solidus temperature and range, meltability, etc., were atomized into conventional brazing alloy powder. Thereafter, a variety of mechanical tests were performed. In addition to providing the close control between liquidus and solidus melting temperatures, it was found that the brazing alloy of the present invention was superior to other gold-bearing brazing alloys intended for similar applications in such characteristics as 1200°F stress rupture strength and 1100°F high cycle fatigue. For example, the data summarized in FIG. 1 for 1100°F high cycle fatigue shows the advantage of example 6 of the Table over alloy A which consisted nominally, by weight, of about 41% Au, about 1.7% Si, about 1% B with the balance Ni and incidental impurities and over alloy B which consisted nominally, by weight, of 82% Au and 18% Ni. FIG. 2 shows a similar graphical comparison between such alloys and that of the present invention in respect to 1200°F rupture properties. The advantage of the present invention is clearly shown. The term "ksi" in the drawing means "thousands of pounds per square inch".

One important characteristic of the brazing alloy of the present invention is its relatively narrow range between liquidus and solidus temperatures. In its specifically preferred composition range of 18–21% Au, 2–4% Si, 1.5–3% B, 5–8% Cr, 1–3% Fe with the balance essentially Ni, for example as represented by example 6 in the Table, such temperature difference can be as small as 50F°. In general, the alloy composition in its broad form provides such a range of no greater than about 125F° with the preferred form being 100°F or less depending upon the selected composition.

As was mentioned, all of the elements Cr, Fe, B, Si and Au are required in the nickel base in order to provide the improved characteristics of the brazing alloy of the present invention. Such elements as Mn are specifically to be avoided because of their adverse effect on oxidation resistance. More importantly, they are not useful for brazing in a vacuum because Mn will sublime in a vacuum and contaminate the system as well as result in varying compositional changes in the alloy which remains.

Au is included within the broad range of about 14–25% primarily for ductility and some melting point depressant function. In the evaluation of the present invention, examples 10 and 11 of the Table indicated that the range of 10–12.5% Au was too low for reduction in liquidus temperature.

Si and B function as melting point depressants, but each alone does not depress the melting point sufficiently to provide a brazing alloy useful in the range of that intended for the alloy of the present invention. On the other hand, both Si and B contribute to the erosivity and brittleness of the alloy. Therefore, a careful balance between these two elements must be maintained. It has been found that below about 1% Si, the melting point is too high whereas above about 5% Si the erosivity is increased to an unsuitable point. Similarly, below about 1% B is too small an amount to lower melting point. Above about 4% B, at which a eutectic point in the Ni-B phase structure exists, a reversal in melting point trend occurs. Therefore, with increasing B above about 4 wt. %, the melting point is increased rather than decreased.

Important to the present invention is the inclusion of both Cr and Fe for their effect in tightening the liquidus/solidus temperature range. In addition, Cr provides improved oxidation resistance and also acts somewhat as a melting point depressant. However, greater than about 12% Cr unduly increases melting point without added benefit in other characteristics. Thus Cr is included within the range of about 2–12 wt. %.

The absence of Fe results in too wide a spread between liquidus and solidus temperatures. Therefore, Fe is included within the range of about 1–5 wt. %.

As an improvement in ductility and to replace a portion of the Au, if desired, the element Pd can be included up to about 17 wt. %. In addition, Co can be substituted for up to about half of the Ni with substantially no effect on the alloy of the present invention except for a slight decrease in melting temperature.

The improved composition of the present invention provides a brazing alloy which is useful at a brazing temperature in the range of about 1800–1975°F. Unlike other similar alloys, the alloy of the present invention leaves substantially no residue after brazing.

Although the present invention has been described in connection with specific examples and embodiments, it will be readily understood by those skilled in the art the variations and modifications of which the invention is capable without departing from its broad scope.

What is claimed is:

1. An improved nickel-base brazing alloy consisting essentially of, by weight, 14–25% Au, 1–5% Si, 1–4% B, 2–12% Cr, 1–5% Fe, up to about 17% Pd, with the balance Ni and incidental impurities with up to about 50% of the Ni replaceable by Co.

2. The brazing alloy of claim 1 in which the Au is 14.9–20.5%, the Si is 1.6–4.4%, the B is 1–2.5%, the Cr is 2.8–12% and the Fe is 1.2–2.7%.

3. The brazing alloy of claim 1 in which the Au is 15–21%, the Si is 2–5%, the B is 1–3%, the Cr is 4–12% and the Fe is 1–3%.

4. The brazing alloy of claim 3 in which the Au is 18–21%, the Si is 2–4%, the B is 1.5–3%, the Cr is 5–8% and the Pd is up to about 6%.

* * * * *